United States Patent
Kim et al.

(10) Patent No.: US 10,428,910 B2
(45) Date of Patent: Oct. 1, 2019

(54) PLANETARY GEAR TRAIN OF AUTOMATIC TRANSMISSION FOR VEHICLE

(71) Applicant: Hyundai Motor Company, Seoul (KR)

(72) Inventors: Jong Soo Kim, Seoul (KR); Jong Sool Park, Hwaseong-si (KR); Kyeong Hun Lee, Seoul (KR); Dong Hwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 369 days.

(21) Appl. No.: 15/248,631

(22) Filed: Aug. 26, 2016

(65) Prior Publication Data

US 2017/0241519 A1    Aug. 24, 2017

(30) Foreign Application Priority Data

Feb. 19, 2016   (KR) .................... 10-2016-0019778

(51) Int. Cl.
*F16H 3/66*   (2006.01)

(52) U.S. Cl.
CPC ....... *F16H 3/666* (2013.01); *F16H 2200/006* (2013.01); *F16H 2200/0069* (2013.01); *F16H 2200/2012* (2013.01); *F16H 2200/2043* (2013.01); *F16H 2200/2046* (2013.01)

(58) Field of Classification Search
CPC .... F16H 3/66; F16H 3/666; F16H 2200/2012; F16H 2200/2043; F16H 2200/006
See application file for complete search history.

(56) References Cited

U.S. PATENT DOCUMENTS

| | | |
|---|---|---|
| 6,984,187 B2 | 1/2006 | Biermann |
| 2014/0371023 A1* | 12/2014 | Janson ............ F16H 3/66 |
| | | 475/275 |

FOREIGN PATENT DOCUMENTS

| | | |
|---|---|---|
| JP | 2012-154393 A | 8/2012 |
| KR | 10-2005-0045598 A | 5/2005 |
| KR | 10-2011-0131817 A | 12/2011 |

* cited by examiner

*Primary Examiner* — Erin D Bishop
(74) *Attorney, Agent, or Firm* — Morgan, Lewis & Bockius LLP (57) ABSTRACT

A planetary gear train of an automatic transmission for a vehicle may include a first planetary gear set, a second planetary gear set, a third planetary gear set, a fourth planetary gear set, an input shaft mounted with the first, second, and third planetary gear sets, an output shaft mounted with the fourth planetary gear set, a first shaft, a second shaft directly connected with the input shaft, a third shaft, a fourth shaft, a fifth shaft, a sixth shaft selectively connectable with the fourth shaft, a seventh shaft selectively connectable with the input shaft, an eighth shaft gear-meshed with one shaft among the fourth and seventh shafts, a ninth shaft directly connected with the output shaft, a tenth shaft gear-meshed with a remaining shaft among the fourth and seventh shafts that is not gear-meshed with the eighth shaft, and transfer gears.

24 Claims, 9 Drawing Sheets

| Shift-stage | Control element | | | | | Gear ratio | Step ratio | Remark |
| --- | --- | --- | --- | --- | --- | --- | --- | --- |
| | C1 | C2 | C3 | B1 | B2 | | | |
| D1 | ● | | | | ● | 5.82 | - | Gear ratio span : 9.13 |
| D2 | | ● | | ● | ● | 3.71 | 1.57 | |
| D3 | ● | ● | | ● | | 2.42 | 1.54 | |
| D4 | | ● | ● | ● | | 1.88 | 1.29 | |
| D5 | ● | | ● | ● | | 1.38 | 1.36 | |
| D6 | ● | ● | ● | | | 1.00 | 1.38 | |
| D7 | ● | | ● | | ● | 0.82 | 1.21 | Ratio of REV vs D1 : -0.77 |
| D8 | | ● | ● | | ● | 0.64 | 1.29 | |
| REV | | | ● | ● | ● | -4.49 | - | |

| Shift-stage | Control element | | | | | | Gear ratio | Step ratio | Remark |
|---|---|---|---|---|---|---|---|---|---|
| | C1 | C2 | C3 | C4 | B1 | B2 | | | |
| D1 | ● | | | | ● | ● | 4.01 | - | Gear ratio span : 8.92 |
| D2 | | ● | | | ● | ● | 2.60 | 1.54 | |
| D3 | ● | ● | | | ● | | 1.75 | 1.49 | |
| D4 | | ● | ● | | ● | | 1.35 | 1.30 | |
| D5 | | | ● | ● | ● | | 1.17 | 1.16 | |
| D6 | ● | | ● | | ● | | 0.97 | 1.20 | |
| D7 | ● | | ● | ● | | | 0.83 | 1.17 | |
| D8 | ● | ● | ● | | | | 0.69 | 1.20 | |
| D9 | ● | | ● | | | ● | 0.58 | 1.20 | Ratio of REV vs D1 : -0.79 |
| D10 | | ● | ● | | | ● | 0.45 | 1.28 | |
| REV | | | ● | | ● | ● | -3.18 | - | |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2016-0019778, filed Feb. 19, 2016, the entire contents of which is incorporated herein for all purposes by this reference.

BACKGROUND OF THE INVENTION

Field of the Invention

The present invention relates to an automatic transmission for a vehicle.

Description of Related Art

Recent increases in oil prices are triggering stiff competition in enhancing fuel consumption of a vehicle.

In this sense, research on an automatic transmission has been performed to simultaneously provide better drivability and fuel consumption by achieving more shift stages.

In order to achieve more shift stages for an automatic transmission, the number of parts is typically increased, which may deteriorate installability, production cost, weight and/or power flow efficiency.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to six control elements (frictional elements), and may easily become lengthy, thereby deteriorating installability.

In this regard, disposing planetary gear sets in parallel or employing dog clutches instead of wet-type control elements has been attempted. However, such an arrangement is not widely applicable, and using dog clutches may easily deteriorate shift-feel.

In addition, a recent eight-speed automatic transmission typically shows a gear ratio span in a level of 6.5 to 7.5, which requires improvement for better fuel consumption.

Thus, shortening a length of an automatic transmission without deteriorating performance will be beneficial.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of realizing at least eight forward speeds and at least one reverse speed by a combination of four planetary gear sets, two external gears and five or six control elements, thereby providing improvement of power delivery performance and fuel consumption and improving installability by reducing a length.

In addition, various aspects of the present invention are directed to providing a planetary gear train of an automatic transmission for a vehicle having a wide available range of varying gear teeth of transfer gears to enable easy obtaining of optimum gear ratios for respective vehicles, thereby improving power delivery performance and fuel consumption.

According to various aspects of the present invention, a planetary gear train of an automatic transmission for a vehicle may include a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, an input shaft mounted with the first, second, and third planetary gear sets at an external circumference of the input shaft, an output shaft disposed parallel to the input shaft and mounted with the fourth planetary gear set on an external circumference of the output shaft, a first shaft connecting the first rotation element and the fourth rotation element and selectively acting as a fixed element, a second shaft connected with the second rotation element and directly connected with the input shaft, a third shaft interconnecting the third rotation element and the seventh rotation element, a fourth shaft connected with the fifth rotation element, a fifth shaft connected with the sixth rotation element and selectively acting as a fixed element, a sixth shaft connected with the eighth rotation element, and selectively connectable with the fourth shaft, a seventh shaft connected with the ninth rotation element, and selectively connectable with the input shaft, an eighth shaft connected with the tenth rotation element and gear-meshed with one shaft among the fourth and seventh shafts, a ninth shaft connected with the eleventh rotation element and directly connected with the output shaft, a tenth shaft connected with the twelfth rotation element, and gear-meshed with a remaining shaft among the fourth and seventh shafts that is not gear-meshed with the eighth shaft, and transfer gears, each gear-meshed with at least one of the first to ninth shafts.

The first planetary gear set may include a first sun gear as the first rotation element, a first planet carrier as the second rotation element, and a first ring gear as the third rotation element, the second planetary gear set may include a second sun gear as the fourth rotation element, a second planet carrier as the fifth rotation element, and a second ring gear as the sixth rotation element, the third planetary gear set may include a third sun gear as the seventh rotation element, a third ring gear as the eighth rotation element, and a third planet carrier as the ninth rotation element, and the fourth planetary gear set may include a fourth sun gear as the tenth rotation element, a fourth planet carrier as the eleventh rotation element, and a fourth ring gear as the twelfth rotation element.

The third planetary gear set may be integrally or monolitcally rotatable by selectively connecting at least two rotation elements among the seventh, eighth, and ninth rotation elements.

The eighth shaft may be gear-meshed with the seventh shaft thereby selectively acting as an input element, and the tenth shaft is gear-meshed with the fourth shaft.

The transfer gears may include a first transfer gear disposed between the seventh shaft and the eighth shaft, and a second transfer gear disposed between the fourth shaft and the tenth shaft.

The planetary gear train may further include a first clutch disposed between the seventh shaft and the input shaft, a second clutch disposed between the third shaft and the seventh shaft, a third clutch disposed between the fourth shaft and the sixth shaft, a first brake disposed between the fifth shaft and a transmission housing, and a second brake disposed between the first shaft and the transmission housing.

The planetary gear train may further include a first clutch disposed between the seventh shaft and the input shaft, a second clutch disposed between the third shaft and the sixth shaft, a third clutch disposed between the fourth shaft and the sixth shaft, a first brake disposed between the fifth shaft and a transmission housing, and a second brake disposed between the first shaft and the transmission housing.

The planetary gear train may further include a first clutch disposed between the seventh shaft and the input shaft, a second clutch disposed between the sixth shaft and the seventh shaft, a third clutch disposed between the fourth shaft and the sixth shaft, a first brake disposed between the fifth shaft and a transmission housing, and a second brake disposed between the first shaft and the transmission housing.

The fourth planetary gear set may be integrally rotatable by selectively connecting at least two rotation elements among the tenth, eleventh, and twelfth rotation elements.

The planetary gear train may further include a first clutch disposed between the seventh shaft and the input shaft, a second clutch disposed between the third shaft and the seventh shaft, a third clutch disposed between the fourth shaft and the sixth shaft, a fourth clutch disposed between the eighth shaft and the tenth shaft, a first brake disposed between the fifth shaft and a transmission housing, and a second brake disposed between the first shaft and the transmission housing.

The planetary gear train may further include a first clutch disposed between the seventh shaft and the input shaft, a second clutch disposed between the third shaft and the sixth shaft, a third clutch disposed between the fourth shaft and the sixth shaft, a fourth clutch disposed between the eighth shaft and the tenth shaft, a first brake disposed between the fifth shaft and a transmission housing, and a second brake disposed between the first shaft and the transmission housing.

The planetary gear train may further include a first clutch disposed between the seventh shaft and the input shaft, a second clutch disposed between the sixth shaft and the seventh shaft, a third clutch disposed between the fourth shaft and the sixth shaft, a fourth clutch disposed between the eighth shaft and the tenth shaft, a first brake disposed between the fifth shaft and a transmission housing, and a second brake disposed between the first shaft and the transmission housing.

The eighth shaft may be gear-meshed with the fourth shaft, and the tenth shaft may be gear-meshed with the seventh shaft thereby selectively acting as an input element.

The transfer gears may include a first transfer gear disposed between the seventh shaft and the tenth shaft, and a second transfer gear disposed between the fourth shaft and the eighth shaft.

According to various aspects of the present invention, a planetary gear train of an automatic transmission for a vehicle may include a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, an input shaft mounted with the first, second, and third planetary gear sets at an external circumference of the input shaft, and an output shaft disposed parallel to the input shaft and mounted with the fourth planetary gear set on an external circumference of the output shaft, in which the first and fourth rotation elements may be directly connected together and selectively connectable with a transmission housing, the second rotation element may be directly connected with the input shaft, the third rotation element may be directly connected with the seventh rotation element, the fifth rotation element may be gear-meshed with one rotation element among the tenth and twelfth rotation elements and selectively connectable with the eighth rotation element, the sixth rotation element may be selectively connectable with the transmission housing, the ninth rotation element may be gear-meshed with a remaining rotation element among the tenth and twelfth rotation elements that may be not gear-meshed with the fifth rotation element, and selectively connectable with the input shaft, and the eleventh rotation element may be directly connected with the output shaft.

The third planetary gear set may be integrally rotatable by selectively connecting at least two rotation elements among the seventh, eighth, and ninth rotation elements.

The ninth rotation element may be gear-meshed with the tenth rotation element through a first transfer gear, and the fifth rotation element may be gear-meshed with the twelfth rotation element through a second transfer gear.

The planetary gear train may further include a first clutch selectively connecting the ninth rotation element and the input shaft, a second clutch selectively connecting the seventh rotation element and the ninth rotation element, a third clutch selectively connecting the fifth rotation element and the eighth rotation element, a first brake selectively connecting the sixth rotation element with the transmission housing, and a second brake selectively connecting the fourth rotation element with the transmission housing.

The planetary gear train may further include a first clutch selectively connecting the ninth rotation element and the input shaft, a second clutch selectively connecting the seventh rotation element and the eighth rotation element, a third clutch selectively connecting the fifth rotation element and the eighth rotation element, a first brake selectively connecting the sixth rotation element with the transmission housing, and a second brake selectively connecting the fourth rotation element with the transmission housing.

The planetary gear train may further include a first clutch selectively connecting the ninth rotation element and the input shaft, a second clutch selectively connecting the eighth rotation element and the ninth rotation element, a third clutch selectively connecting the fifth rotation element and the eighth rotation element, a first brake selectively connecting the sixth rotation element with the transmission housing, and a second brake selectively connecting the fourth rotation element with the transmission housing.

The fourth planetary gear set may be integrally rotatable by selectively connecting at least two rotation elements among the tenth, eleventh, and twelfth rotation elements.

The planetary gear train may further include a first clutch selectively connecting the ninth rotation element and the input shaft, a second clutch selectively connecting the seventh rotation element and the ninth rotation element, a third clutch selectively connecting the fifth rotation element and the eighth rotation element, a fourth clutch selectively connecting the tenth rotation element and the twelfth rotation element, a first brake selectively connecting the sixth rotation element with the transmission housing, and a second brake selectively connecting the fourth rotation element with the transmission housing.

The planetary gear train may further include a first clutch selectively connecting the ninth rotation element and the input shaft, a second clutch selectively connecting the seventh rotation element and the eighth rotation element, a third clutch selectively connecting the fifth rotation element and the eighth rotation element, a fourth clutch selectively connecting the tenth rotation element and the twelfth rotation element, a first brake selectively connecting the sixth rotation element with the transmission housing, and a second brake selectively connecting the fourth rotation element with the transmission housing.

The planetary gear train may further include a first clutch selectively connecting the ninth rotation element and the input shaft, a second clutch selectively connecting the eighth rotation element and the ninth rotation element, a third clutch selectively connecting the fifth rotation element and the eighth rotation element, a fourth clutch selectively connecting the tenth rotation element and the twelfth rotation element, a first brake selectively connecting the sixth rotation element with the transmission housing, and a second brake selectively connecting the fourth rotation element with the transmission housing.

The ninth rotation element may be gear-meshed with the twelfth rotation element through a first transfer gear, and the fifth rotation element may be gear-meshed with the tenth rotation element through a second transfer gear.

According to a planetary gear train of various embodiments of the present invention, planetary gear sets are dividedly arranged on input and output shafts disposed in parallel, thereby reducing a length and improving installability.

According to a planetary gear train of various embodiments of the present invention, at least eight forward speeds and at least one reverse speed are realized by employing two transfer gears in addition to a combination of planetary gear sets, thereby providing a wide range of varying gear teeth so as to easily achieve optimum gear ratio and to easily comply with required performance for respective vehicles.

In addition, according to a planetary gear train of various embodiments of the present invention, a gear ratio span of more than 8.9 may be achieved while realizing at least eight forward speeds and at least one reverse speed, thereby maximizing an engine driving efficiency.

Furthermore, the linearity of step ratios of shift stages is secured while multi-staging the shift stages with high efficiency, thereby making it possible to improve drivability such as acceleration before and after a shift, an engine speed rhythmic sense, and the like.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
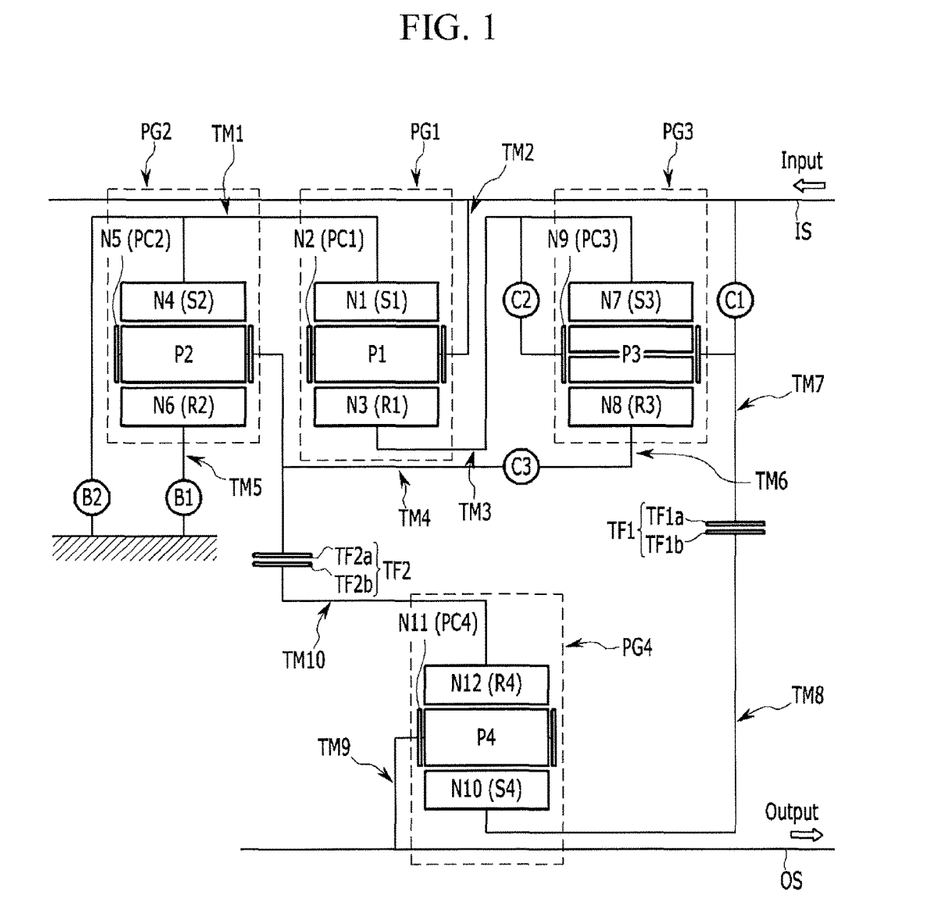
FIG. 1 is a schematic diagram of a planetary gear train according to various embodiments of the present invention.

FIG. 1 is a schematic diagram of a planetary gear train according to a first exemplary embodiment of the present invention.

Referring to FIG. 1, a planetary gear train according to various embodiments of the present invention includes an input shaft IS, an output shaft OS, first, second, third, and fourth planetary gear sets PG1, PG2, PG3, and PG4, two transfer gears TF1 and TF2, and control elements of three clutches C1, C2, and C3 and two brakes B1 and B2.

The input shaft IS is an input member and the torque from a crankshaft of an engine is input into the input shaft IS, after being torque-converted through a torque converter.

The output shaft OS is an output member, and, arranged in parallel with the input shaft IS, outputs a shifted driving torque to a drive shaft through a differential apparatus.

The first, second, and third planetary gear sets PG1, PG2, and PG3 are arranged at external circumference of the input shaft IS and form a main shifting portion. With the first planetary gear set PG1 being centrally located, the third planetary gear set PG3 is arranged toward an engine side, and the second planetary gear set PG2 is arranged toward an opposite side of the engine.

The fourth planetary gear set PG4 is arranged at an external circumference of the output shaft OS disposed in parallel with the input shaft IS and forms an auxiliary shifting portion.

The first planetary gear set PG1 is a single pinion planetary gear set, and includes a first sun gear S1, a first planet carrier PC1 that supports first pinion P1 externally engaged with the first sun gear S1, and a first ring gear R1 that is internally engaged with the first pinion P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 that supports second pinion P2 externally engaged with the second sun gear S2, and a second ring gear R2 that is internally engaged with the second pinion P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a double pinion planetary gear set, and includes a third sun gear S3, a third ring gear R3 that is internally gear-meshed with a third pinion P3 externally gear-meshed with the third sun gear S3, and a third planet carrier PC3 that supports the third pinion P3. The third sun gear S3 acts as a seventh rotation element N7, the third ring gear R3 acts as an eighth rotation element N8, and the third planet carrier PC3 acts as a ninth rotation element N9.

The fourth planetary gear set PG4 is a single pinion planetary gear set, and includes a fourth sun gear S4, a fourth planet carrier PC4 that supports fourth pinion P4 externally engaged with the fourth sun gear S4, and a fourth ring gear R4 that is internally engaged with the fourth pinion P4. The fourth sun gear S4 acts as a tenth rotation element N10, the fourth planet carrier PC4 acts as a eleventh rotation element N11, and the fourth ring gear R4 acts as a twelfth rotation element N12.

In the arrangement of the first, second, and third planetary gear sets PG1, PG2, and PG3, the first rotation element N1 is directly connected with the fourth rotation element N4, the third rotation element N3 is directly connected with the seventh rotation element N7, by seven shafts TM1 to TM7.

Three shafts TM8 to TM10 are connected to the fourth planetary gear set PG4.

The ten shafts TM1 to TM10 are hereinafter described in detail.

The first shaft TM1 interconnects the first rotation element N1 (first sun gear S1) and the fourth rotation element N4 (second sun gear S2), and is selectively connectable with the transmission housing H, thereby selectively acting as a fixed element.

The second shaft TM2 is connected with the second rotation element N2 (first planet carrier PC1), and directly connected with the input shaft IS, thereby continuously acting as an input element.

The third shaft TM3 interconnects the third rotation element N3 (first ring gear R1) and the seventh rotation element N7 (third sun gear S3).

The fourth shaft TM4 is connected with fifth rotation element N5 (second planet carrier PC2).

The fifth shaft TM5 is connected with the sixth rotation element N6 (second ring gear R2), and selectively connectable with the transmission housing H, thereby selectively acting as a fixed element.

The sixth shaft TM6 is connected with the eighth rotation element N8 (third ring gear R3), and selectively connectable with the fourth shaft TM4.

The seventh shaft TM7 is connected with the ninth rotation element N9 (third planet carrier PC3), selectively connectable with the input shaft IS, and selectively connectable with the third shaft TM3.

The eighth shaft TM8 is connected with the tenth rotation element N10 (fourth sun gear S4), and externally gear-meshed with the seventh shaft TM7.

The ninth shaft TM9 is connected with the eleventh rotation element N11 (fourth planet carrier PC4), and directly connected with the output shaft OS, thereby continuously acting as an output element.

The tenth shaft TM10 is connected with the twelfth rotation element N12 (fourth ring gear R4), and externally gear-meshed with the fourth shaft TM4.

The two transfer gear TF1 and TF2 delivers a shifted torque of the main shifting portion having the first, second, and third planetary gear sets PG1, PG2, and PG3 to the auxiliary shifting portion having the fourth planetary gear set PG4, in a reverse rotation.

The first transfer gear TF1 includes a first transfer drive gear TF1$a$ connected with the seventh shaft TM7 and a first transfer driven gear TF1$b$ connected with the eighth shaft TM8 and externally gear-meshes the seventh shaft TM6 and the eighth shaft TM8.

The second transfer gear TF2 includes a second transfer drive gear TF2$a$ connected with the fourth shaft TM4 and a second transfer driven gear TF2$b$ connected with the tenth shaft TM10 and externally gear-meshes the fourth shaft TM4 and the tenth shaft TM10.

As a result, respective shafts connected by the first and second transfer gears TF1 and TF2 rotate in opposite directions, and the gear ratios of the first and second transfer gears TF1 and TF2 may be preset in consideration of required speed ratio of the transmission.

The control elements include the three clutches C1, C2, and C3 and the two brakes B1 and B2, and are arranged as follows.

The first clutch C1 is arranged between the input shaft IS and the seventh shaft TM7, such that the input shaft IS and the seventh shaft TM7 may selectively become integral.

The second clutch C2 is arranged between the third shaft TM3 and the seventh shaft TM7, such that the third shaft TM3 and the seventh shaft TM7 may selectively become integral.

The third clutch C3 is arranged between the fourth shaft TM4 and the sixth shaft TM6, such that the fourth shaft TM4 and the sixth shaft TM6 may selectively become integral.

The first brake B1 is arranged between the fifth shaft TM5 and the transmission housing H, such that the fifth shaft TM5 may selectively act as a fixed element.

The second brake B2 is arranged between the first shaft TM1 and the transmission housing H, such that first shaft TM1 may selectively act as a fixed element.

The second clutch C2 selectively connects at least two rotation elements among the seventh, eighth, and ninth rotation elements TM7, TM8, and TM9 of the third planetary gear set PG3, and thus, may unify the third planetary gear set PG3.

The respective control elements of the first, second, third, and fourth clutches C1, C2, C3, and C4 and the first and second brakes B1 and B2 may be realized as multi-plate hydraulic pressure friction devices that are frictionally engaged by hydraulic pressure.

Figure 2:
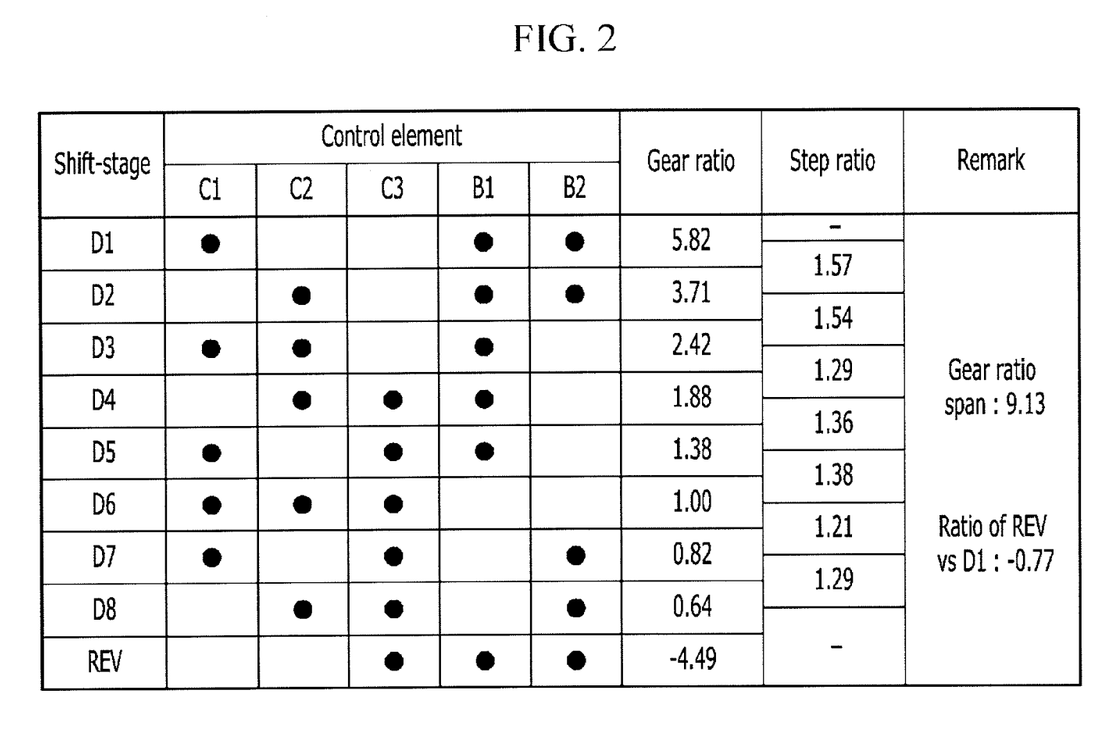
FIG. 2 is an operational chart for respective control elements at respective shift-stages in the planetary gear train according to various embodiments of the present invention.

FIG. 2 is an operational chart for respective control elements at respective shift-stages in a planetary gear train according to a first exemplary embodiment of the present invention.

Referring to FIG. 2, a planetary gear train according to an exemplary embodiment of the present invention realizes shifting by operating three control elements among the three clutches C1, C2, and C3 and the two brakes B1 and B2.

[the forward first speed]

In the forward first speed D1, the first clutch C1 and the first and second brakes B1 and B2 are operated.

As a result, the seventh shaft TM7 is connected with the input shaft IS by the operation of the first clutch C1. In this state, a torque of the input shaft IS is input to the second shaft TM2 and the seventh shaft TM7, and the fifth, first shaft TM5 and TM1 acts as a fixed element by the operation of the first and second brakes B1 and B2, thereby realizing the forward first speed by cooperative operation of respective shafts and outputting a shifted torque to the output shaft OS connected with the ninth shaft TM9.

[the forward second speed]

In the forward second speed D2, the second clutch C2 and the first and second brakes B1 and B2 are operated.

As a result, the third shaft TM3 is connected with the seventh shaft TM7 the operation of the second clutch C2, and thus the third planetary gear set PG3 integrally rotates. In this state, the torque of the input shaft IS is input to the second shaft TM2, and the fifth and first shafts TM5 and TM1 acts as a fixed element by the operation of the first and second brakes B1 and B2, thereby realizing the forward second speed by cooperative operation of respective shafts and outputting a shifted torque to the output shaft OS connected with the ninth shaft TM9.

[the forward third speed]

In the forward third speed D3, the first and second clutch C1 and C2 and the first brake B1 are operated.

As a result, the seventh shaft TM7 is connected with the input shaft IS by the operation of the first clutch C1, and the third shaft TM3 is connected with the seventh shaft TM7 by the operation of the second clutch C2 thereby forcing the third planetary gear set PG3 to integrally rotate. In this state, a torque of the input shaft IS is input to the second shaft TM2 and the seventh shaft TM7, and the fifth shaft TM5 acts as a fixed element by the operation of the first brake B1, thereby realizing the forward third speed by cooperative operation of respective shafts and outputting a shifted torque to the output shaft OS connected with the ninth shaft TM9.

[the forward fourth speed]

In the forward fourth speed D4, the second and third clutches C2 and C3 and the first brake B1 are operated.

As a result, the third shaft TM3 is connected with the seventh shaft TM7 by the operation of the second clutch C2, and the fourth shaft TM4 is connected with the sixth shaft TM6 by the operation of the third clutch C3 thereby forcing the third planetary gear set PG3 to integrally rotate. In this state, the torque of the input shaft IS is input to the second shaft TM2, and the fifth shaft TM5 acts as a fixed element by the operation of the first brake B1, thereby realizing the forward fourth speed by cooperative operation of respective shafts and outputting a shifted torque to the output shaft OS connected with the ninth shaft TM9.

[the forward fifth speed]

In the forward fifth speed D5, the first and third clutches C1 and C3 and the first brake B1 are operated.

As a result, the seventh shaft TM7 is connected with the input shaft IS by the operation of the first clutch C1, and the fourth shaft TM4 is connected with the sixth shaft TM6 by the operation of the third clutch C3. In this state, the torque of the input shaft IS is input to the second and seventh shafts TM2 and TM7, and the fifth shaft TM5 act as a fixed element by the operation of the first brake B1, thereby realizing the forward fifth speed by cooperative operation of respective shafts and outputting a shifted torque to the output shaft OS connected with the ninth shaft TM9.

[the forward sixth speed]

In the forward sixth speed D6, the first, second, and third clutches C1, C2, and C3 are operated.

As a result, the seventh shaft TM7 is connected with the input shaft IS by the operation of the first clutch C1, the third shaft TM3 is connected with the seventh shaft TM7 by the operation of the second clutch C2, and the fourth shaft TM4 is connected with the sixth shaft TM6 by the operation of the third clutch C3 thereby forcing the first, second, and third planetary gear sets PG1, PG2, and PG3 to integrally rotate entirely. In this state, the torque of the input shaft IS is input to the second and seventh shafts TM2 and TM7, thereby realizing the sixth speed and outputting a shifted torque to the output shaft OS connected with the ninth shaft TM9.

[the forward seventh speed]

In the forward seventh speed D7, the first and third clutches C1 and C3 and the second brake B2 are operated.

As a result, the seventh shaft TM7 is connected with the input shaft IS by the operation of the first clutch C1, and the fourth shaft TM4 is connected with the sixth shaft TM6 by the operation of the third clutch C3. In this state, the torque of the input shaft IS is input to the second and seventh shafts TM2 and TM7, and the first shaft TM1 acts as a fixed element by the operation of the second brake B2, thereby realizing the forward seventh speed by cooperative operation of respective shafts and outputting a shifted torque to the output shaft OS connected with the ninth shaft TM9.

[the forward eighth speed]

In the forward eighth speed D8, the second and third clutches C2 and C3 and the second brake B2 are operated.

As a result, the third shaft TM3 is connected with the seventh shaft TM7 by the operation of the second clutch C2, and the fourth shaft TM4 is connected with the sixth shaft TM6 by the operation of the third clutch C3 thereby forcing the third planetary gear set PG3 to integrally rotate. In this state, the torque of the input shaft IS is input to the second shaft TM2, and the first shaft TM1 acts as a fixed element by the operation of the second brake B2, thereby realizing the forward eighth speed by cooperative operation of respective shafts and outputting a shifted torque to the output shaft OS connected with the ninth shaft TM9.

[the reverse speed]

In the reverse speed REV, the third clutch C3 and the first and second brakes B1 and B2 are operated.

As a result, the fourth shaft TM4 is connected with the sixth shaft TM6 by the operation of the third clutch C3. In this state, the torque of the input shaft IS is input to the second shaft TM2 and, and the fifth and first shafts TM5 and TM1 act as a fixed element by the operation of the first and second brakes B1 and B2, thereby realizing the reverse speed by cooperative operation of the shafts and outputting a shifted torque to the output shaft OS connected with the ninth shaft TM9.

FIG. 2 shows gear ratios calculated under the condition that the gear ratio of the first ring gear R1/the first sun gear S1 is 1.76, the gear ratio of the second ring gear R2/the second sun gear S2 is 2.42, the gear ratio of the third ring gear R3/third sun gear S3 is 2.21, the gear ratio of the fourth ring gear R4/the fourth sun gear S4 is 2.50, the gear ratio of the first transfer driven gear TF1b/the first transfer drive gear TF1a is 1.66, and the gear ratio of the second transfer driven gear TF2b/the second transfer drive gear TF2a is 0.86.

Figure 3:
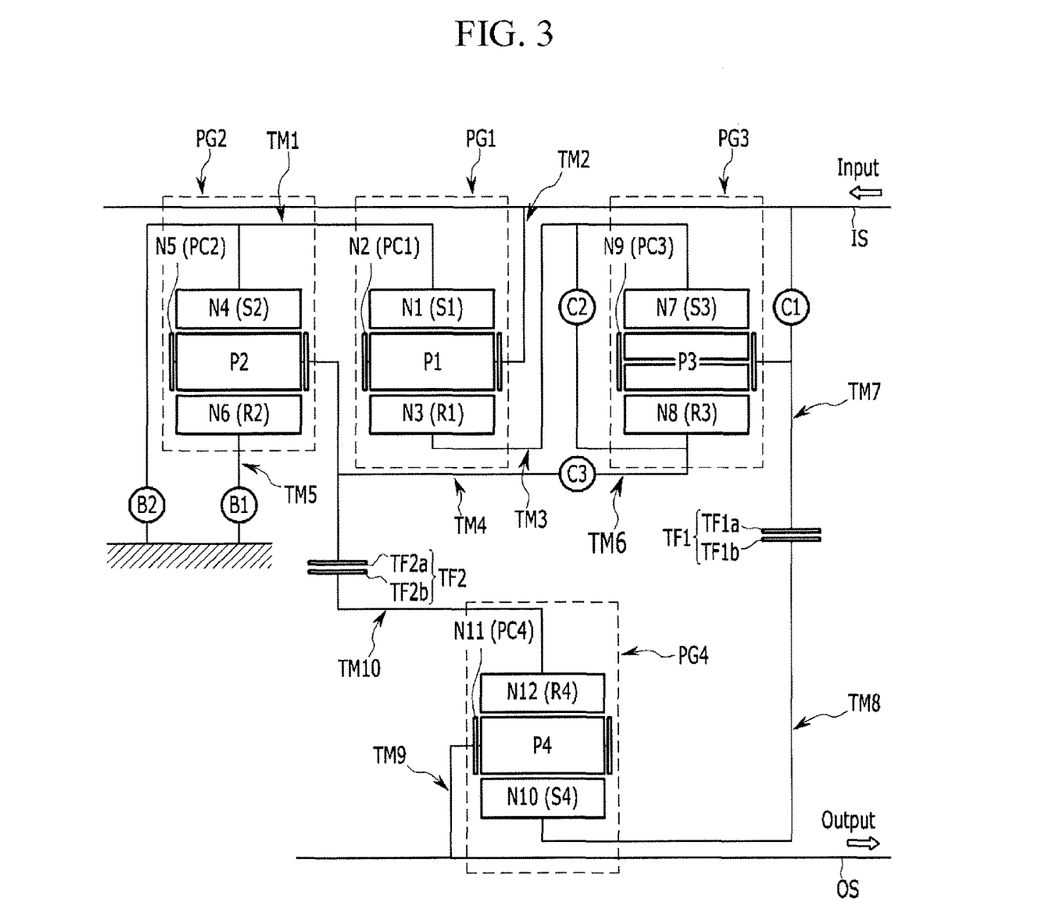
FIG. 3 is a schematic diagram of a planetary gear train according to various embodiments of the present invention.

FIG. 3 is a schematic diagram of a planetary gear train according to a second exemplary embodiment of the present invention.

In a planetary gear train according to a first exemplary embodiment of the present invention, the second clutch C2 for unifying the third planetary gear set PG3 is arranged between the third shaft TM3 and the seventh shaft TM7, as shown in FIG. 1. However, referring to FIG. 3, The second clutch C2 is arranged between the third shaft TM3 and the sixth shaft TM6, in a planetary gear train according to a second exemplary embodiment.

As a result, the second exemplary embodiment merely differs from a planetary gear train according to a first exemplary embodiment in the location of the second clutch C2, and maintains operation and function of the first exemplary embodiment, which is therefore not described in further detail.

Figure 4:
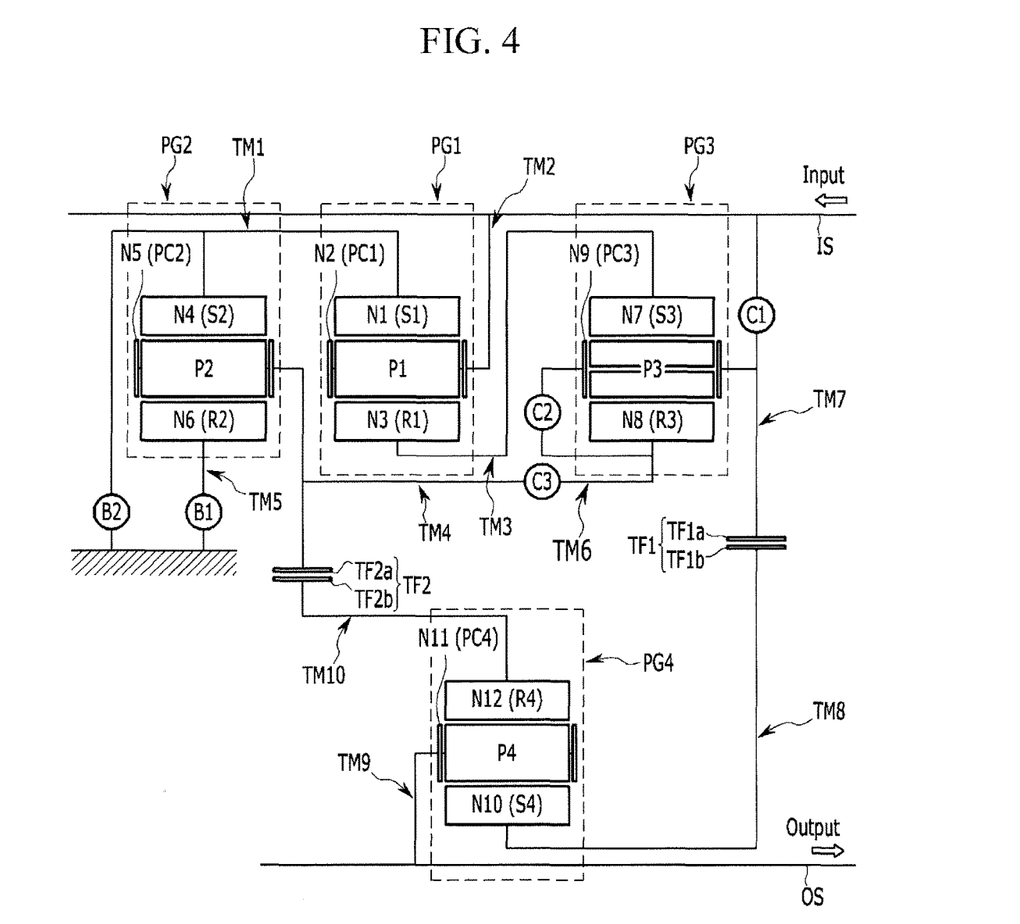
FIG. 4 is a schematic diagram of a planetary gear train according to various embodiments of the present invention.

FIG. 4 is a schematic diagram of a planetary gear train according to a third exemplary embodiment of the present invention.

In a planetary gear train according to a first exemplary embodiment of the present invention, the second clutch C2 for unifying the third planetary gear set PG3 is arranged between the third shaft TM3 and the seventh shaft TM7, as shown in FIG. 1. However, referring to FIG. 4, the second clutch C2 is arranged between the sixth shaft TM6 and the seventh shaft TM7, in a planetary gear train according to a third exemplary embodiment.

As a result, the third exemplary embodiment merely differs from a planetary gear train according to a first exemplary embodiment in the location of the second clutch C2, and maintains operation and function of the first exemplary embodiment, which is therefore not described in further detail.

Figure 5:
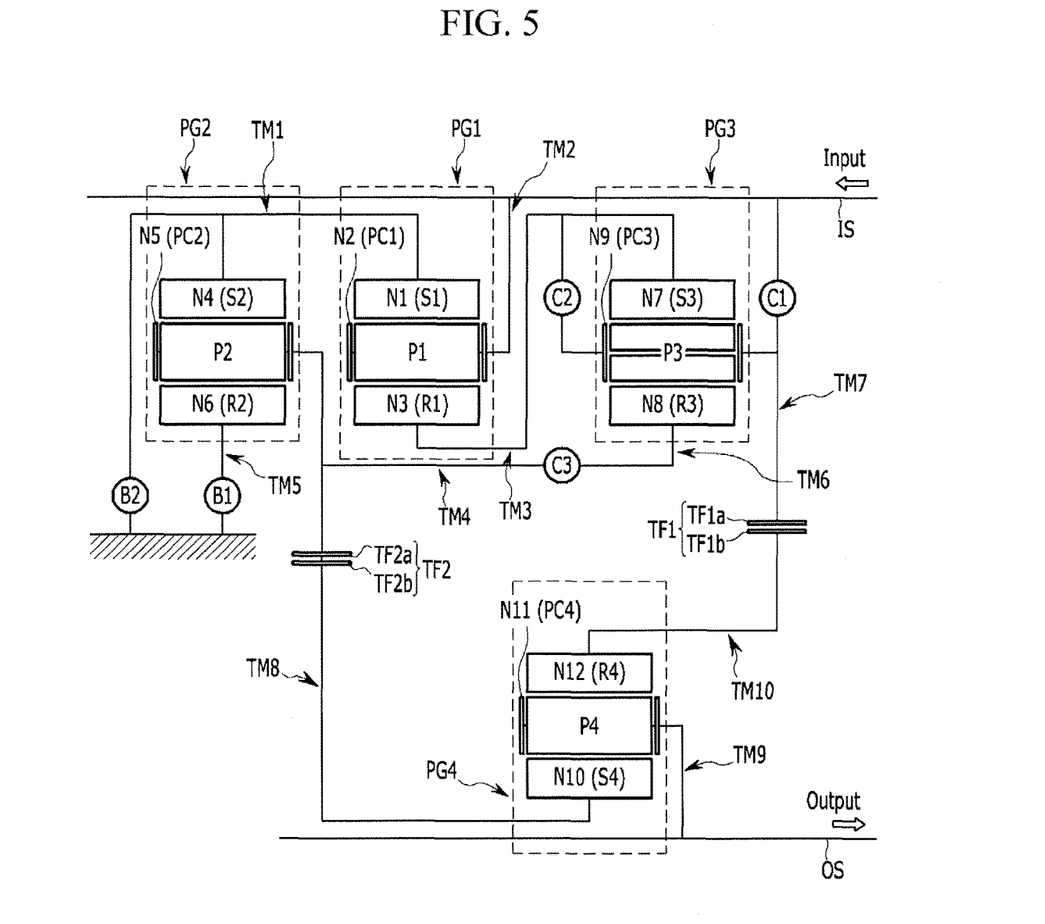
FIG. 5 is a schematic diagram of a planetary gear train according to various embodiments of the present invention.

FIG. 5 is a schematic diagram of a planetary gear train according to a fourth exemplary embodiment of the present invention.

In a planetary gear train according to a first exemplary embodiment of the present invention, the seventh shaft TM7 is externally gear-meshed with the eighth shaft TM8 through the first transfer gear TF1, and the fourth shaft TM4 is externally gear-meshed with the tenth shaft TM10 through second transfer gear TF2, as shown in FIG. 1.

However, referring to FIG. 5, the seventh shaft TM7 is externally gear-meshed with the tenth shaft TM10 through the first transfer gear TF1, and the fourth shaft TM4 is externally gear-meshed with the eighth shaft TM8 through the second transfer gear TF2, in the fourth exemplary embodiment.

As a result, the fourth exemplary embodiment differs from the first exemplary embodiment in that the rotation speeds output through the seventh shaft TM7 and the fourth shaft TM4 are changed. However, this means that only the speed ratio of the auxiliary shifting portion is changed but the operation and shift pattern remains the same as in the first exemplary embodiment, which is therefore not described in further detail.

Figure 6:
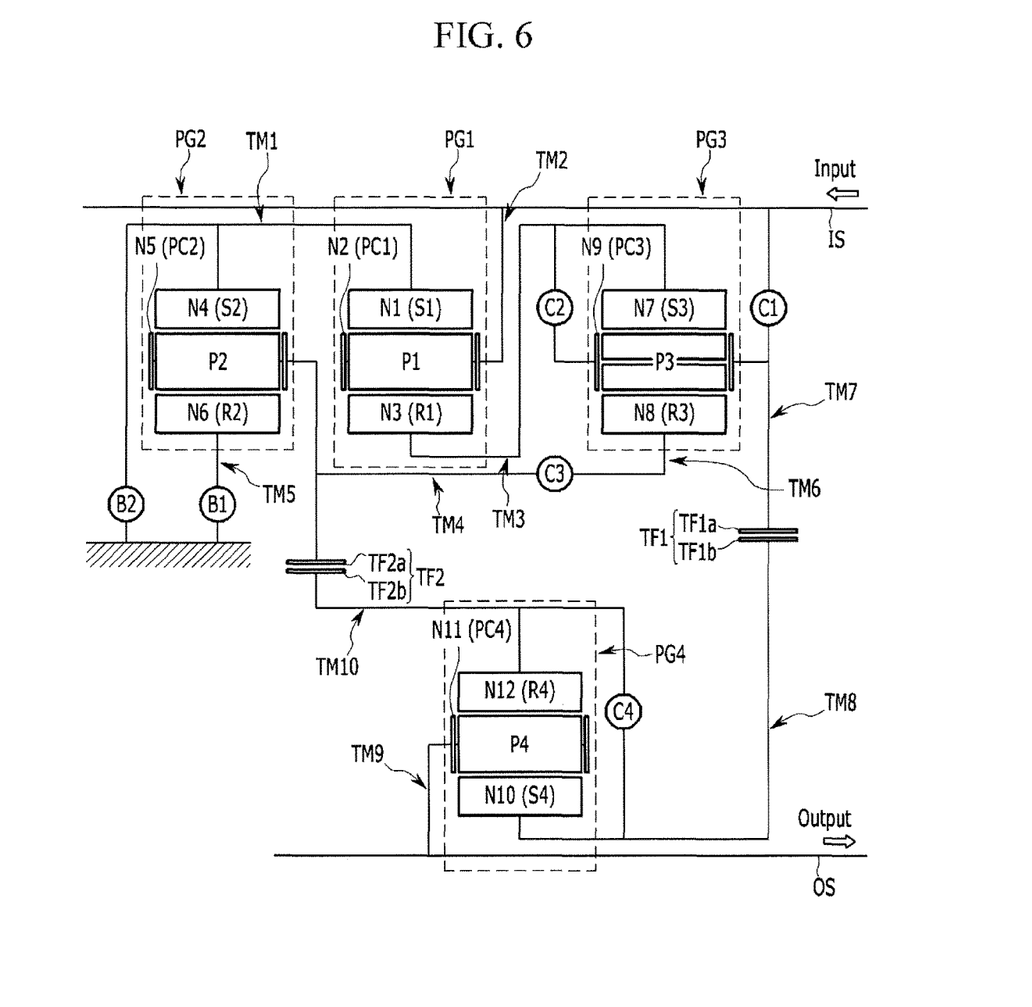
FIG. 6 is a schematic diagram of a planetary gear train according to various embodiments of the present invention.

FIG. 6 is a schematic diagram of a planetary gear train according to a fifth exemplary embodiment of the present invention.

In a planetary gear train according to a first exemplary embodiment of the present invention, a clutch for unifying the fourth planetary gear set PG4 is not employed, as shown in FIG. 1. However, referring to FIG. 6, a fourth clutch C4 for unifying the fourth planetary gear set PG4 is arranged between the eighth shaft TM8 and the tenth shaft TM10, in the planetary gear train according to a fifth exemplary embodiment.

As a result, the fifth exemplary embodiment differs from a planetary gear train according to a first exemplary embodiment in that the fourth clutch C4 is further included for unifying the fourth planetary gear set PG4. By such an arrangement, the number of shift-stages is increased to the ten forward speeds, and thereby gear ratios, step ratios, and a gear ratio span may be changed. Besides the above, arrangement of other constituent elements and operation and function of the gear train remains the same as in the first exemplary embodiment.

Figure 7:
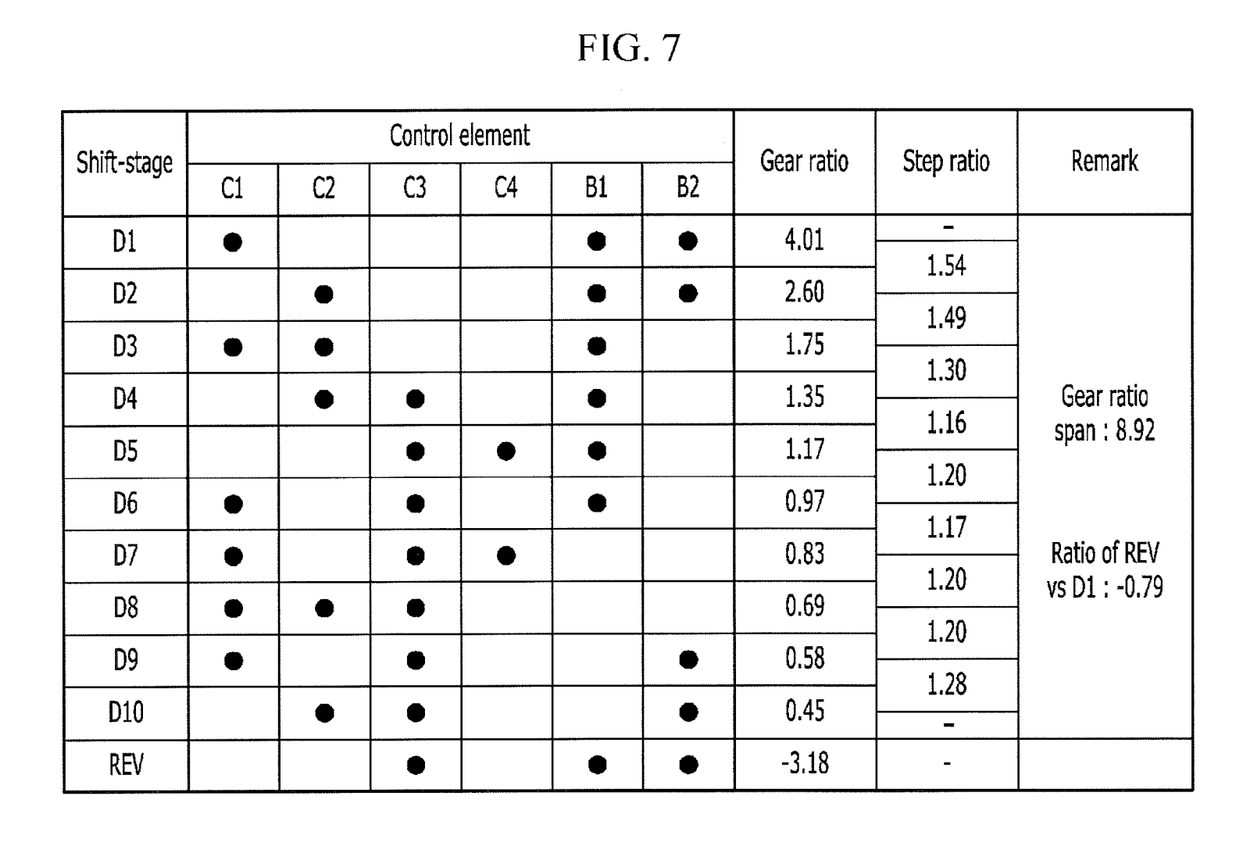
FIG. 7 is an operational chart for respective control elements at respective shift-stages in a planetary gear train according to various embodiments of the present invention.

FIG. 7 is an operational chart for respective control elements at respective shift-stages in a planetary gear train according to a fifth exemplary embodiment of the present invention.

Referring to FIG. 7, a planetary gear train according to an exemplary embodiment of the present invention realizes shifting by operating three control elements among the four clutches C1, C2, C3, and C4 and the two brakes B1 and B2.

[the forward first speed]

In the forward first speed D1, the same as in the first exemplary embodiment, the first clutch C1 and the first and second brakes B1 and B2 are operated.

As a result, the seventh shaft TM7 is connected with the input shaft IS by the operation of the first clutch C1. In this state, a torque of the input shaft IS is input to the second shaft TM2 and the seventh shaft TM7, and the fifth and first shafts TM5 and TM1 acts as a fixed element by the operation of the first and second brakes B1 and B2, thereby realizing the forward first speed by cooperative operation of respective shafts and outputting a shifted torque to the output shaft OS connected with the ninth shaft TM9.

[the forward second speed]

In the forward second speed D2, the same as in the first exemplary embodiment, the second clutch C2 and the first and second brakes B1 and B2 are operated.

As a result, the third shaft TM3 is connected with the seventh shaft TM7 by the operation of the second clutch C2 thereby forcing the third planetary gear set PG3 to integrally rotate. In this state, the torque of the input shaft IS is input to the second shaft TM2, and the fifth and first shafts TM5 and TM1 acts as a fixed element by the operation of the first and second brakes B1 and B2, thereby realizing the forward second speed by cooperative operation of respective shafts and outputting a shifted torque to the output shaft OS connected with the ninth shaft TM9.

[the forward third speed]

In the forward third speed D3, the same as in the first exemplary embodiment, the first and second clutch C1 and C2 and the first brake B1 are operated.

As a result, the seventh shaft TM7 is connected with the input shaft IS by the operation of the first clutch C1, and the third shaft TM3 is connected with the seventh shaft TM7 by the operation of the second clutch C2 thereby forcing the third planetary gear set PG3 to integrally rotate. In this state, a torque of the input shaft IS is input to the second shaft TM2 and the seventh shaft TM7, and the fifth shaft TM5 acts as a fixed element by the operation of the first brake B1, thereby realizing the forward third speed by cooperative operation of respective shafts and outputting a shifted torque to the output shaft OS connected with the ninth shaft TM9.

[the forward fourth speed]

In the forward fourth speed D4, the same as in the first exemplary embodiment, the second and third clutches C2 and C3 and the first brake B1 are operated.

As a result, the third shaft TM3 is connected with the seventh shaft TM7 by the operation of the second clutch C2, and the fourth shaft TM4 is connected with the sixth shaft TM6 by the operation of the third clutch C3 thereby forcing the third planetary gear set PG3 to integrally rotate. In this state, the torque of the input shaft IS is input to the second shaft TM2, and the fifth shaft TM5 acts as a fixed element by the operation of the first brake B1, thereby realizing the forward fourth speed by cooperative operation of respective shafts and outputting a shifted torque to the output shaft OS connected with the ninth shaft TM9.

[the forward fifth speed]

In the forward fifth speed D5, the third and fourth clutches C3 and C4 and the first brake B1 are operated.

As a result, the fourth shaft TM4 is connected with the sixth shaft TM6 by the operation of the third clutch C3, and the eighth shaft TM8 is connected with the tenth shaft TM10 by the operation of the fourth clutch C4 thereby forcing the fourth planetary gear set PG4 to integrally rotate. In this state, the torque of the input shaft IS is input to the second shaft TM2, and the fifth shaft TM5 acts as a fixed element by the operation of the first brake B1, thereby realizing the forward fifth speed by cooperative operation of respective shafts and outputting a shifted torque to the output shaft OS connected with the ninth shaft TM9.

[the forward sixth speed]

In the forward sixth speed D6, the first and third clutches C1 and C3 and the first brake B1 are operated.

As a result, the seventh shaft TM7 is connected with the input shaft IS by the operation of the first clutch C1, and the fourth shaft TM4 is connected with the sixth shaft TM6 by the operation of the third clutch C3. In this state, the torque of the input shaft IS is input to the second and seventh shafts TM2 and TM7, and the fifth shaft TM5 acts as a fixed element by the operation of the first brake B1, thereby realizing the forward sixth speed by cooperative operation of respective shafts and outputting a shifted torque to the output shaft OS connected with the ninth shaft TM9.

[the forward seventh speed]

In the forward seventh speed D7, the first, third, and fourth clutches C1, C3, and C4 are operated.

As a result, the seventh shaft TM7 is connected with the input shaft IS by the operation of the first clutch C1, the fourth shaft TM4 is connected with the sixth shaft TM6 by the operation of the third clutch C3, and the eighth shaft TM8 is connected with the tenth shaft TM10 by the operation of the fourth clutch C4 thereby forcing the fourth planetary gear set PG4 to integrally rotate. In this state, the torque of the input shaft IS is input to the second and seventh shafts TM2 and TM7, thereby realizing the forward seventh speed by cooperative operation of respective shafts and outputting a shifted torque to the output shaft OS connected with the ninth shaft TM9.

[the forward eighth speed]

In the forward eighth speed D8, the first, second, and third clutches C1, C2, and C3 are operated.

As a result, the seventh shaft TM7 is connected with the input shaft IS by the operation of the first clutch C1, the third shaft TM3 is connected with the seventh shaft TM7 by the operation of the second clutch C2 and, and the fourth shaft TM4 is connected with the sixth shaft TM6 by the operation of the third clutch C3 thereby forcing the first, second, and third planetary gear sets PG1, PG2, and PG3 to integrally rotate entirely. In this state, the torque of the input shaft IS is input to the second and seventh shafts TM2 and TM7, and the fourth planetary gear set PG4 receives different rotations speeds through the first and second transfer gears TF1 and TF2, thereby realizing the forward eighth speed and outputting a shifted torque to the output shaft OS connected with the ninth shaft TM9.

[the forward ninth speed]

In the forward ninth speed D9, the first and third clutches C1 and C3 and the second brake B2 are operated.

As a result, the seventh shaft TM7 is connected with the input shaft IS by the operation of the first clutch C1, and the fourth shaft TM4 is connected with the sixth shaft TM6 by the operation of the third clutch C3. In this state, the torque of the input shaft IS is input to the second and seventh shafts TM2 and TM7, and the first shaft TM1 acts as a fixed element by the operation of the second brake B2, thereby realizing the forward ninth speed by cooperative operation of respective shafts and outputting a shifted torque to the output shaft OS connected with the ninth shaft TM9.

[the forward tenth speed]

In the forward tenth speed D10, the second and third clutches C2 and C3 and the second brake B2 are operated.

As a result, the third shaft TM3 is connected with the seventh shaft TM7 by the operation of the second clutch C2, and the fourth shaft TM4 is connected with the sixth shaft TM6 by the operation of the third clutch C3 thereby forcing the third planetary gear set PG3 to integrally rotate. In this state, the torque of the input shaft IS is input to the second shaft TM2, and the first shaft TM1 acts as a fixed element by the operation of the second brake B2, thereby realizing the forward tenth speed by cooperative operation of respective shafts and outputting a shifted torque to the output shaft OS connected with the ninth shaft TM9.

[the reverse speed]

In the reverse speed REV, the third clutch C3 and the first and second brakes B1 and B2 are operated.

As a result, the fourth shaft TM4 is connected with the sixth shaft TM6 by the operation of the third clutch C3. In this state, the torque of the input shaft IS is input to the second shaft TM2, and the fifth and first shafts TM5 and TM1 act as a fixed element by the operation of the first and second brakes B1 and B2, thereby realizing the reverse speed by cooperative operation of the shafts and outputting a shifted torque to the output shaft OS connected with the ninth shaft TM9.

Figure 8:
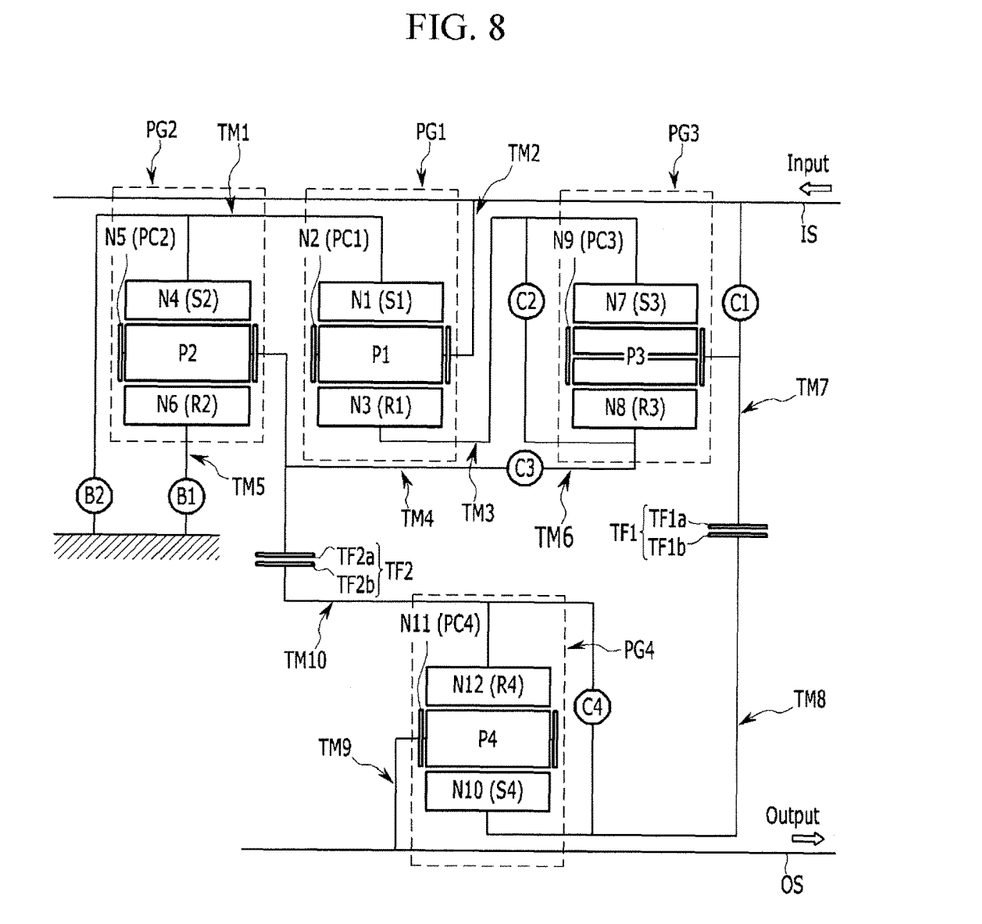
FIG. 8 is a schematic diagram of a planetary gear train according to various embodiments of the present invention.

FIG. 8 is a schematic diagram of a planetary gear train according to a sixth exemplary embodiment of the present invention.

In a planetary gear train according to a fifth exemplary embodiment, the second clutch C2 for unifying the third planetary gear set PG3 is arranged between the third shaft TM3 and the seventh shaft TM7, as shown in FIG. 6. However, referring to FIG. 8, the second clutch C2 is arranged between the third shaft TM3 and the sixth shaft TM6, in a planetary gear train according to a sixth exemplary embodiment.

As a result, the sixth exemplary embodiment merely differs from a planetary gear train according to a fifth exemplary embodiment in the location of the second clutch C2, and maintains operation and function of the fifth exemplary embodiment, which is therefore not described in further detail.

Figure 9:
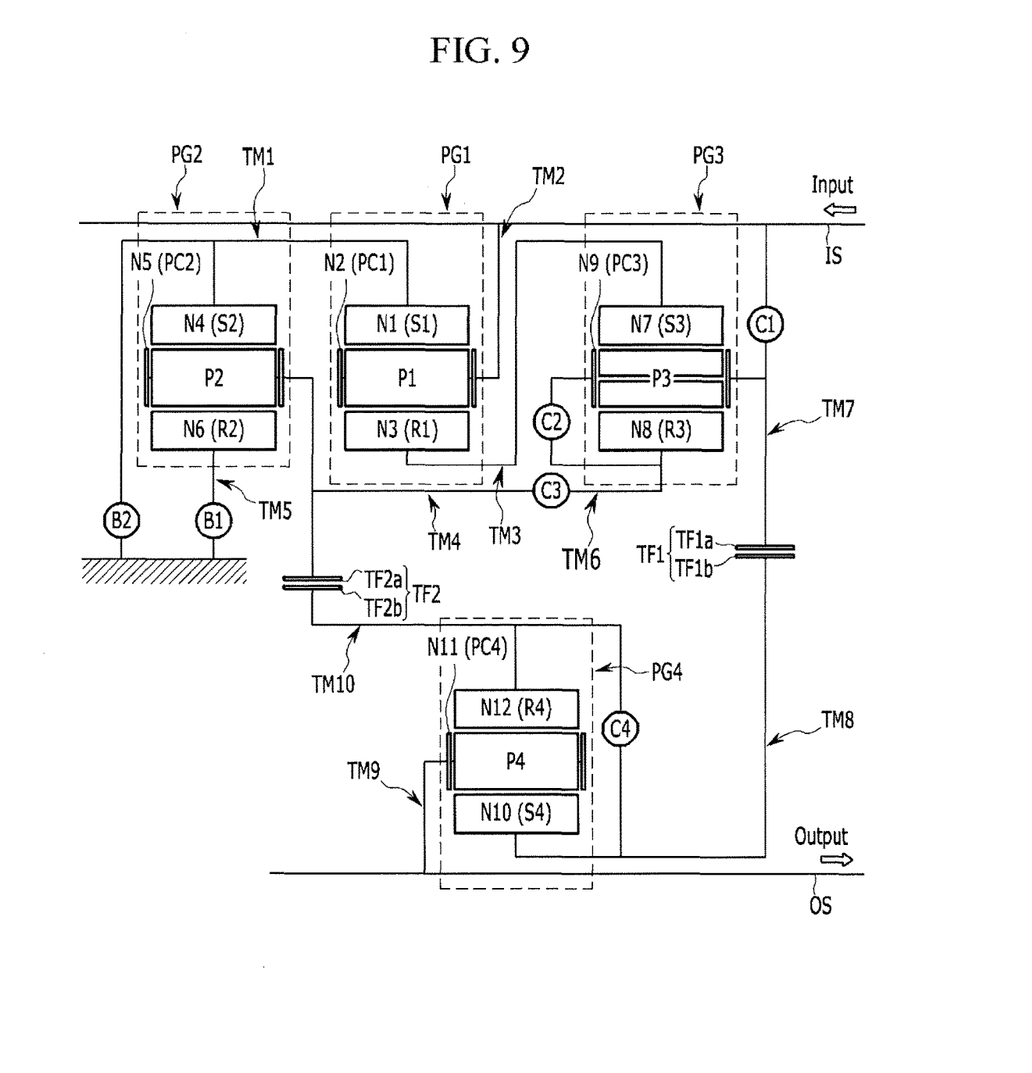
FIG. 9 is a schematic diagram of a planetary gear train according to various embodiments of the present invention.

FIG. 9 is a schematic diagram of a planetary gear train according to a seventh exemplary embodiment of the present invention.

In a planetary gear train according to a fifth exemplary embodiment, the second clutch C2 for unifying the third planetary gear set PG3 is arranged between the third shaft TM3 and the seventh shaft TM7, as shown in FIG. 6. However, referring to FIG. 9, the second clutch C2 is arranged between the sixth shaft TM6 and the seventh shaft TM7, in a planetary gear train according to a seventh exemplary embodiment.

As a result, the seventh exemplary embodiment merely differs from a planetary gear train according to a fifth exemplary embodiment in the location of the second clutch C2, and maintains operation and function of the fifth exemplary embodiment, which is therefore not described in further detail.

As described above, according to a planetary gear train according to an exemplary embodiment of the present invention, at least eight forward speeds and at least one reverse speed may be realized by a combination of four planetary gear sets, two transfer gears, and five or six control elements, thereby providing improvement of power delivery performance and fuel consumption and improving installability by shortening the length of an automatic transmission.

In addition, according to a planetary gear train according to an exemplary embodiment of the present invention, two transfer gears of external gears arranged on the output shaft OS are employed in addition to three planetary gear sets, and thus, gear teeth may be widely varied so as to easily achieve optimum gear ratio and to easily comply with required performance for respective vehicles.

In addition, according to a planetary gear train according to an exemplary embodiment of the present invention, a gear ratio span of more than 8.9 may be achieved while realizing at least eight forward speeds and at least one reverse speed, thereby maximizing an engine driving efficiency.

In addition, the linearity of step ratios of shift stages is secured while multi-staging the shift stage with high efficiency, thereby making it possible to improve drivability such as acceleration before and after a shift, an engine speed rhythmic sense, and the like.

For convenience in explanation and accurate definition in the appended claims, the terms "upper", "lower", "inner" and "outer", "up," "down," "upper", "lower," "upwards," "downwards", "front", "rear", "back", "inside", "outside", "inwardly," "outwardly," "interior", "exterior", "inner," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element;
    an input shaft mounted with the first, second, and third planetary gear sets at an external circumference of the input shaft;
    an output shaft disposed parallel to the input shaft and mounted with the fourth planetary gear set on an external circumference of the output shaft;
    a first shaft connecting the first rotation element and the fourth rotation element and selectively acting as a fixed element;
    a second shaft connected with the second rotation element and directly connected with the input shaft;
    a third shaft interconnecting the third rotation element and the seventh rotation element;
    a fourth shaft connected with the fifth rotation element;
    a fifth shaft connected with the sixth rotation element and selectively acting as a fixed element;
    a sixth shaft fixedly connected with the eighth rotation element, and selectively connectable with the fourth shaft;
    a seventh shaft connected with the ninth rotation element, and selectively connectable with the input shaft;
    an eighth shaft connected with the tenth rotation element and gear-meshed with one shaft among the fourth and seventh shafts via a first transfer gear set;
    a ninth shaft connected with the eleventh rotation element and directly connected with the output shaft; and
    a tenth shaft connected with the twelfth rotation element, and gear-meshed with a remaining shaft among the fourth and seventh shafts that is not gear-meshed with the eighth shaft, via a second transfer gear set,
    wherein the first planetary gear set comprises a first sun gear as the first rotation element, a first planet carrier as the second rotation element, and a first ring gear as the third rotation element,
    wherein the second planetary gear set comprises a second sun gear as the fourth rotation element, a second planet carrier as the fifth rotation element, and a second ring gear as the sixth rotation element,
    wherein the third planetary gear set comprises a third sun gear as the seventh rotation element, a third ring gear as the eighth rotation element, and a third planet carrier as the ninth rotation element, and
    wherein the fourth planetary gear set comprises a fourth sun gear as the tenth rotation element, a fourth planet carrier as the eleventh rotation element, and a fourth ring gear as the twelfth rotation element.

2. The planetary gear train of claim 1, wherein at least two rotation elements among the seventh rotation element, the eighth rotation element, and the ninth rotation element in the third planetary gear set are integrally rotatable by selectively connecting the at least two rotation elements among the seventh rotation element, the eighth rotation element, and the ninth rotation element.

3. The planetary gear train of claim 2, wherein
    the eighth shaft is gear-meshed with the seventh shaft thereby selectively acting as an input element; and
    the tenth shaft is gear-meshed with the fourth shaft.

4. The planetary gear train of claim 3,
    wherein the first transfer gear set is disposed between the seventh shaft and the eighth shaft; and
    wherein the second transfer gear set is disposed between the fourth shaft and the tenth shaft.

5. The planetary gear train of claim 2, further comprising:
a first clutch disposed between the seventh shaft and the input shaft;
a second clutch disposed between the third shaft and the seventh shaft;
a third clutch disposed between the fourth shaft and the sixth shaft;
a first brake disposed between the fifth shaft and a transmission housing; and
a second brake disposed between the first shaft and the transmission housing.

6. The planetary gear train of claim 2, further comprising:
a first clutch disposed between the seventh shaft and the input shaft;
a second clutch disposed between the third shaft and the sixth shaft;
a third clutch disposed between the fourth shaft and the sixth shaft;
a first brake disposed between the fifth shaft and a transmission housing; and
a second brake disposed between the first shaft and the transmission housing.

7. The planetary gear train of claim 2, further comprising:
a first clutch disposed between the seventh shaft and the input shaft;
a second clutch disposed between the sixth shaft and the seventh shaft;
a third clutch disposed between the fourth shaft and the sixth shaft;
a first brake disposed between the fifth shaft and a transmission housing; and
a second brake disposed between the first shaft and the transmission housing.

8. The planetary gear train of claim 2, wherein at least two rotation elements among the tenth rotation element, the eleventh rotation element, and the twelfth rotation element of the fourth planetary gear set are integrally rotatable by selectively connecting the at least two rotation elements among the tenth rotation element, the eleventh rotation element, and the twelfth rotation element.

9. The planetary gear train of claim 8, further comprising:
a first clutch disposed between the seventh shaft and the input shaft;
a second clutch disposed between the third shaft and the seventh shaft;
a third clutch disposed between the fourth shaft and the sixth shaft;
a fourth clutch disposed between the eighth shaft and the tenth shaft;
a first brake disposed between the fifth shaft and a transmission housing; and
a second brake disposed between the first shaft and the transmission housing.

10. The planetary gear train of claim 8, further comprising:
a first clutch disposed between the seventh shaft and the input shaft;
a second clutch disposed between the third shaft and the sixth shaft;
a third clutch disposed between the fourth shaft and the sixth shaft;
a fourth clutch disposed between the eighth shaft and the tenth shaft;
a first brake disposed between the fifth shaft and a transmission housing; and
a second brake disposed between the first shaft and the transmission housing.

11. The planetary gear train of claim 8, further comprising:
a first clutch disposed between the seventh shaft and the input shaft;
a second clutch disposed between the sixth shaft and the seventh shaft;
a third clutch disposed between the fourth shaft and the sixth shaft;
a fourth clutch disposed between the eighth shaft and the tenth shaft;
a first brake disposed between the fifth shaft and a transmission housing; and
a second brake disposed between the first shaft and the transmission housing.

12. The planetary gear train of claim 2, wherein
the eighth shaft is gear-meshed with the fourth shaft; and
the tenth shaft is gear-meshed with the seventh shaft thereby selectively acting as an input element.

13. The planetary gear train of claim 12, wherein:
the first transfer gear set is disposed between the seventh shaft and the tenth shaft; and
the second transfer gear set is disposed between the fourth shaft and the eighth shaft.

14. A planetary gear train of an automatic transmission for a vehicle, comprising:
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element;
a fourth planetary gear set including a tenth rotation element, an eleventh rotation element, and a twelfth rotation element;
an input shaft mounted with the first, second, and third planetary gear sets at an external circumference of the input shaft; and
an output shaft disposed parallel to the input shaft and mounted with the fourth planetary gear set on an external circumference of the output shaft,
wherein the first and fourth rotation elements are directly connected together and selectively connectable with a transmission housing,
the second rotation element is directly connected with the input shaft,
the third rotation element is directly connected with the seventh rotation element,
the fifth rotation element is gear-meshed with one rotation element among the tenth and twelfth rotation elements and selectively connectable with the eighth rotation element,
the sixth rotation element is selectively connectable with the transmission housing,
the ninth rotation element is gear-meshed with a remaining rotation element among the tenth and twelfth rotation elements that is not gear-meshed with the fifth rotation element, and selectively connectable with the input shaft, and
the eleventh rotation element is directly connected with the output shaft,
wherein the first planetary gear set comprises a first sun gear as the first rotation element, a first planet earner as the second rotation element, and a first ring gear as the third rotation element, wherein the second planetary gear set comprises a second sun gear as the fourth rotation element, a second planet carrier as the fifth rotation element, and a second ring gear as the sixth rotation element, wherein the third planetary gear set comprises a third sun gear as the seventh rotation element, a third ring gear as the eighth rotation element, and a third planet carrier as the ninth rotation element, and wherein the fourth planetary gear set comprises a fourth sun gear as the tenth rotation element, a fourth planet carrier as the eleventh rotation element, and a fourth ring gear as the twelfth rotation element.

15. The planetary gear train of claim 14, wherein at least two rotation elements among the seventh rotation element, the eighth rotation element, and the ninth rotation element in the third planetary gear set are integrally rotatable by selectively connecting the at least two rotation elements among the seventh rotation element, the eighth rotation element, and the ninth rotation element.

16. The planetary gear train of claim 15, wherein
the ninth rotation element is gear-meshed with the tenth rotation element through a first transfer gear set; and
the fifth rotation element is gear-meshed with the twelfth rotation element through a second transfer gear set.

17. The planetary gear train of claim 15, further comprising;
a first clutch selectively connecting the ninth rotation element and the input shaft;
a second clutch selectively connecting the seventh rotation element and the ninth rotation element;
a third clutch selectively connecting the fifth rotation element and the eighth rotation element;
a first brake selectively connecting the sixth rotation element with the transmission housing; and
a second brake selectively connecting the fourth rotation element with the transmission housing.

18. The planetary gear train of claim 15, further comprising:
a first clutch selectively connecting the ninth rotation element and the input shaft;
a second clutch selectively connecting the seventh rotation element and the eighth rotation element;
a third clutch selectively connecting the fifth rotation element and the eighth rotation element;
a first brake selectively connecting the sixth rotation element with the transmission housing; and
a second brake selectively connecting the fourth rotation element with the transmission housing.

19. The planetary gear train of claim 15, further comprising:
a first clutch selectively connecting the ninth rotation element and the input shaft;
a second clutch selectively connecting the eighth rotation element and the ninth rotation element;
a third clutch selectively connecting the fifth rotation element and the eighth rotation element;
a first brake selectively connecting the sixth rotation element with the transmission housing; and
a second brake selectively connecting the fourth rotation element with the transmission housing.

20. The planetary gear train of claim 15, wherein at least two rotation elements among the tenth rotation element, the eleventh rotation element, and the twelfth rotation element of the fourth planetary gear set are integrally rotatable by selectively connecting the at least two rotation elements among the tenth rotation element, the eleventh rotation element, and the twelfth rotation element.

21. The planetary gear train of claim 20, further comprising:
a first clutch selectively connecting the ninth rotation element and the input shaft;
a second clutch selectively connecting the seventh rotation element and the ninth rotation element;
a third clutch selectively connecting the fifth rotation element and the eighth rotation element;
a fourth clutch selectively connecting the tenth rotation element and the twelfth rotation element;
a first brake selectively connecting the sixth rotation element with the transmission housing; and
a second brake selectively connecting the fourth rotation element with the transmission housing.

22. The planetary gear train of claim 20, further comprising:
a first clutch selectively connecting the ninth rotation element and the input shaft;
a second clutch selectively connecting the seventh rotation element and the eighth rotation element;
a third clutch selectively connecting the fifth rotation element and the eighth rotation element;
a fourth clutch selectively connecting the tenth rotation element and the twelfth rotation element;
a first brake selectively connecting the sixth rotation element with the transmission housing; and
a second brake selectively connecting the fourth rotation element with the transmission housing.

23. The planetary gear train of claim 20, further comprising:
a first clutch selectively connecting the ninth rotation element and the input shaft;
a second clutch selectively connecting the eighth rotation element and the ninth rotation element;
a third clutch selectively connecting the fifth rotation element and the eighth rotation element;
a fourth clutch selectively connecting the tenth rotation element and the twelfth rotation element;
a first brake selectively connecting the sixth rotation element with the transmission housing; and
a second brake selectively connecting the fourth rotation element with the transmission housing.

24. The planetary gear train of claim 15, wherein
the ninth rotation element is gear-meshed with the twelfth rotation element through a first transfer gear set; and
the fifth rotation element is gear-meshed with the tenth rotation element through a second transfer gear set.

* * * * *